(No Model.)
C. V. WOERD.
MACHINE FOR DRILLING AND SPLITTING COLLETS.
No. 357,514. Patented Feb. 8, 1887.
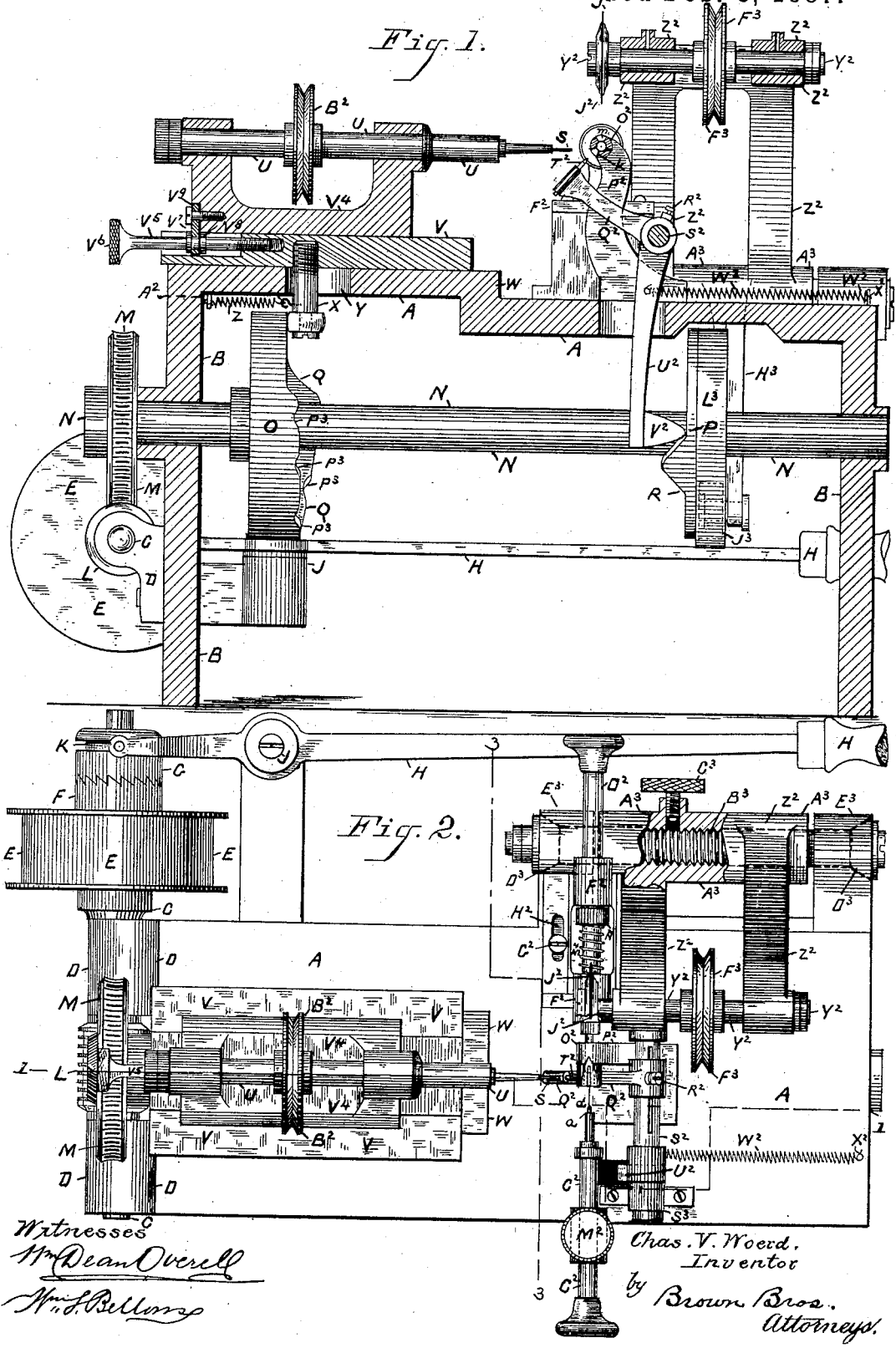
Witnesses
Wm Dean Overell
Wm L Bellows
Chas. V. Woerd,
Inventor
by Brown Bros.,
Attorneys.

(No Model.) 2 Sheets—Sheet 2.
C. V. WOERD.
MACHINE FOR DRILLING AND SPLITTING COLLETS.
No. 357,514. Patented Feb. 8, 1887.
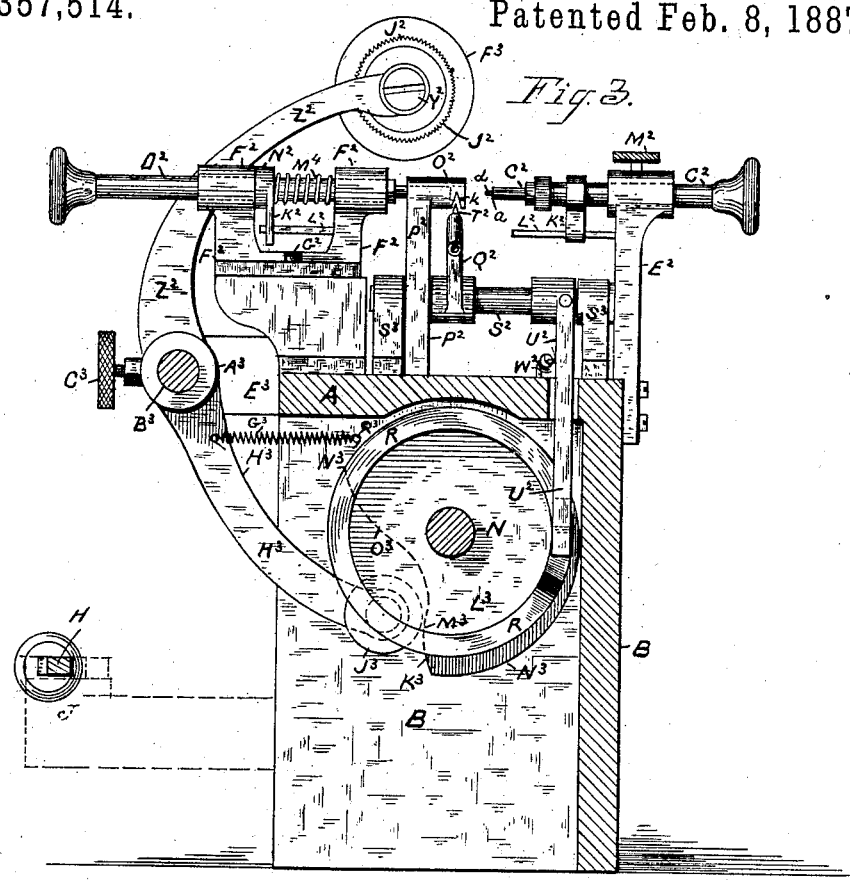
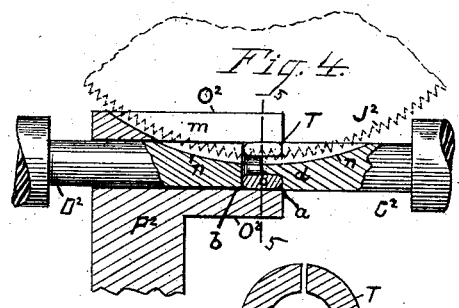
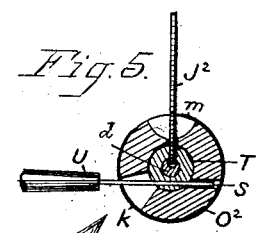
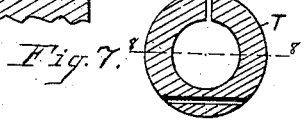
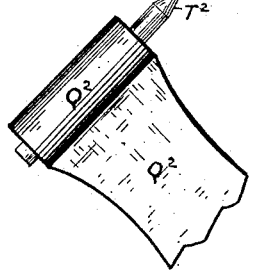
Witnesses.
Chas. V. Woerd
Inventor
by Brown Bros.
Attorneys

UNITED STATES PATENT OFFICE.

CHARLES V. WOERD, OF WALTHAM, MASSACHUSETTS.

MACHINE FOR DRILLING AND SPLITTING COLLETS.

SPECIFICATION forming part of Letters Patent No. 357,514, dated February 8, 1887.

Application filed November 30, 1885. Serial No. 184,321. (No model.)

*To all whom it may concern:*

Be it known that I, CHARLES V. WOERD, of Waltham, in the county of Middlesex and State of Massachusetts, have invented certain new and useful Improvements in Machines for Drilling and Splitting Collets, of which the following is a full, clear, and exact description.

As well known in watch-movements, the hair-spring is attached to the balance-wheel arbor through a collet, which is split radially to adapt it for attachment to and to be friction-tight upon the arbor, and drilled parallel with a tangential line thereof to receive and confine the inner end of the hair-spring and to enable it to be fastened thereto.

This invention relates to a machine for so splitting and drilling collets and at one and the same time; and this machine is composed, in substance, of mechanism to center a collet and hold it firmly in position, with its edge exposed for being split and drilled, as before stated, a rotating circular-saw to split the collet, a prick-punch to mark the collet and thus prepare it for the drill, and a rotating drill to drill the collet. These several parts are constructed and combined and organized in one machine, and all substantially as hereinafter described, and so that having first centered and secured the collet in the machine and set the machine in motion the collet will be first automatically marked by the prick-punch, followed by an automatic drilling and sawing thereof, each in the proper direction and practically at one and the same time and during one complete rotation of a shaft, from the rotation of which the circular saw and drill, otherwise of themselves rotated, are made to approach and retire from the collet, as will hereinafter fully appear.

Considering the machine of this invention, as to its parts above stated, separately:

First. The collet-centering mechanism is composed, in substance, of two mandrels, in coincident vertical and horizontal planes, and each located in separate head-stocks or supports of a common bed-plate, one at least of which supports, preferably, is made adjustable in relation to the other. Each mandrel is capable of being moved lengthwise through its supports, but otherwise is stationary, and their ends presented toward each other are adapted the one to receive a collet resting at one end against a shoulder thereof and the other to act as an abutment for the then exposed or outer end of said collet, and by the two, with the mandrel on which the collet is placed, moved to bring said collet into an abutment against the other mandrel and there fastened, securing a firm hold and confinement of the collet in position and between its two ends, its edge being exposed for the same to be sawed or split and drilled, as has been before stated, under the automatic operation of the saw and drill, and all otherwise substantially as hereinafter described.

Second. The collet-splitting mechanism is composed in substance of a continuously-rotating circular-saw blade suitably attached to a mandrel, which is suitably adapted to be rotated, turning in bearings of a support, constructed and arranged from the continuous rotation of a cam, and during one rotation thereof to be swung forward and backward, and all so as thereby to place the circular saw carried by it automatically into and out of operative position upon the collet, suitably confined and held as aforesaid, or otherwise, first to saw or split the same, as desired, and then to retire therefrom, for the collet so split to be removed, and all otherwise substantially as hereinafter described.

Third. The collet drilling mechanism is composed, in substance, of a prick-punch to mark the collet at the point at which it is to be drilled and in advance of the operation of the drill, which punch is automatically moved forward and backward for the purpose stated, in proper relation to the after-movement of the drill, to drill the collet, and a continuous rotating drill attached to a mandrel, which is suitably adapted to be rotated, turning in bearings of a support constructed and arranged to be automatically moved forward and backward, to present the drill to the collet and feed it into the same, so as to drill it as desired, and preferably from time to time to secure a withdrawal of the drill to free it and the hole of the cuttings made by it, and all otherwise substantially as hereinafter described.

In addition to the above there are other improvements in details of the machine, all of which will hereinafter fully appear, and whereby the working or operating parts of the machine—such as the collet centering, drilling, and splitting mechanisms—are made capable of adjustment in relation to each other and to the collet to be split and drilled, as aforesaid.

In the drawings forming a part of this specification the collet drilling and splitting machine of this invention is illustrated.

Figure 1 is a longitudinal vertical section. Fig. 2 is a plan view. Fig. 3 is a transverse vertical section on line 3 3, Fig. 2. Fig. 4 is a view on an enlarged scale and in detail, illustrating the collet centering and clamping mechanism and the same as clamping a collet. Fig. 5 is a cross-section, in detail, on line 5 5, Fig. 4, showing also the prick-punch. Fig. 6 is an enlarged perspective view of a collet drilled and sawed. Fig. 7 is a section on line 7 7, Fig. 6; and Fig. 8 is a section on line 8 8, Fig. 7.

In the drawings, A represents a bed-plate or platform, supported at its ends and sides by uprights B, and the whole arranged so as to make a suitable support for the running and stationary parts of the machine, to be now described.

C is a horizontal shaft turning in bearings of supports D, secured to one of the uprights B and located below said bed-plate A.

E is a loose driving-pulley on shaft C, and provided with a clutching-collar, F, through which to clutch the pulley E to the shaft C by sliding the spline-jointed clutching-collar G on the shaft into engagement therewith, and thus to secure the rotation of the shaft C from the rotation of the pulley E, which, by belt, (not shown,) is connected to any suitable driving-shaft. (Not shown.)

H is a lever-handle turning on a stationary fulcrum, J, and connecting with a peripheral groove, K, of the sliding clutching-collar G, all as well known, and for the sliding clutch-collar G to rotate freely with the shaft. This horizontal shaft C is the driving-shaft for operating certain parts of the mechanism, as will hereinafter appear, and it has a worm, L, meshing with a vertical worm-gear wheel, M, of a horizontal shaft, N, turning in suitable bearings of the uprights B and located under the bed-plate A.

O and P are two wheels attached to the horizontal shaft N, and each made with a working cam-face, Q and R, respectively, the one, Q, for feeding the drill S of the machine forward to its work on the collet T, to be drilled by it, and at the same time to allow it to be withdrawn from time to time, and also the drill to be returned to its normal position, and the other, R, for moving the prick-punch $T^2$ of the machine forward to mark the collet preparatory to being drilled, and allow it to return, and all during one rotation of the horizontal shaft C and of said cams Q R.

The drill S is attached to and projects from one end of a horizontal shaft or mandrel, U, turning in suitable bearings of a carriage, V, arranged to slide forward and backward on a dovetail way, W, on the upper side of the bed-plate A. This carriage V is made in parts V $V^4$, and these parts are adapted to slide upon each other and in a line parallel with the axis of the drill-mandrel.

$V^5$ is a screw-rod having a milled head, $V^6$, and screwing into one end of the under part, V, of the carriage, and turning loosely in and confined by collars $V^7$ $V^8$ against movement through a vertical ear-piece, $V^9$, attached to the corresponding end of the upper part, $V^4$. Again, the carriage in its under part, V, which is on the dovetail way W of the bed-plate A, has an arm, X, projecting downward from it through a slot, Y, in the bed-plate A, and which slot is parallel with the slide of the carriage, and this arm X has a bearing against the working and rotating cam-face Q, to which it is confined by a spiral spring, Z, at one end connected to it and at the other end to a fixed stud, $A^2$, of the bed-plate.

The arrangement of drill-carriage V and its bearings on the working cam-face Q of the wheel O, above described, as also the shape of said cam-edge, are all such as, under the rotation of the cam and during one rotation thereof, to secure the presentation of the drill and its feed forward to the collet centered and held or clamped, as hereinafter described, and thus to drill the same as desired, and from time to time, as the drill is so being fed, to allow of its withdrawal to clear it and the bore in the collet made by it of the cuttings from the drill, and, finally, to allow of the return of the drill to its normal position, the drill during all this time being under a continuous rotation, secured through the pulley $B^2$ of its mandrel U by a connection with a belt (not shown) to a suitable driving-shaft. (Not shown.)

The collet in position for being drilled under the operation of the drill, as above described, has its axis in a line at right angles to and above the axis of rotation of the drill, and the drilling thereof is in a line at right angles to a radial line thereof, and beginning at one side of the collet, through it to and out at the other and opposite side, Figs. 5, 6, 7, the edge of the collet being presented to the drill. The collet is centered and held between the ends $a$ $b$ of two horizontal mandrels, $C^2$ $D^2$, which are in the same horizontal and vertical planes, and are arranged in supports $E^2$ $F^2$, both attached to the upper side of the bed-plate A, and one, $F^2$, preferably attached thereto by a set-screw, $G^2$, which passes through a slot, $H^2$, thereof, and screws into the bed-plate, said slot running in a direction parallel with the axis of the collet-centering mandrel $D^2$ of said support $F^2$. Said support $F^2$, thus attached to the bed-plate, can be adjusted as to its distance from the support $E^2$, carrying the other collet-centering mandrel, $C^2$, so as to place the end $b$ of its mandrel, between which and the end $a$ of the mandrel $C^2$ of the support $E^2$ the collet is held, nearer to or farther from, as may be desired, or, in other words, in proper relation to the plane of action of the drill S and prick-punch T² and circular saw J² of the machine, as will hereinafter more fully appear.

Each collet-centering mandrel C² D² is confined against turning in its support, but is free to slide lengthwise through the same, moving in a direct rectilinear line and guided by its radial arm K² upon a horizontal stationary guide-rail, L². The holding end $b$ of mandrel C² is turned off, making a teat, $d$, of suitable diameter to receive the collet T, and which placed thereon is set by one of its ends against the shoulder at the inner end of said teat $d$, its other end then being beyond the outer end of the teat.

M² is a thumb-screw for fastening the mandrel C² against movement in its support. The holding end $b$ of the mandrel D² is square-faced, Fig. 4, and between the two vertical parts of its supports F² F² it is surrounded by a coiled spring, M⁴, which is confined at its ends between one of said supports and a collar, N², preferably adjustable of the mandrel and all, so that the mandrel may be pushed toward the other mandrel, C², against the tension of said spring, and be returned to its normal position by the reaction of said spring when the pressure on it is removed.

The two mandrels C² D² in position, holding a collet between their ends, Fig. 4, are within the bore of a horizontal shell, O², having its axis coincident with their axial line, and this shell is carried by a standard, P², attached to the bed-plate, and at proper points, as at $k$ and $m$, the shell is cut away or bored out to allow of the passage of the prick-punch T², drill S, and circular saw J² of the machine through them to the collet located within it and held between the ends of the two mandrels C² D², Fig. 5; and these mandrels are each suitably grooved, as at $n$, Fig. 4, at and along their upper side, to allow the circular saw to cut entirely across the width and through the thickness of the collet in a radial plane, and all as will hereinafter more fully appear.

The prick-punch T² is at the outer end of a vertical radial arm, Q², which is adjustably secured by set-screw R² to a horizontal shaft, S², turning in suitable stationary bearings, S³, of the bed-plate, and having its axis at right angles to the axis of the drill S and a downward-extending arm, U², provided at its lower portion with a nose, V², through which to rest against the cam-face R of the continuously-rotating wheel P of the horizontal shaft N, it being confined in its said rest by the tension of a spiral spring, W², secured at one end to it and at the other to a fixed stud or pin, X², of the bed-plate. The cam-projection R of the rotating wheel P is at one part thereof, and it is suitably shaped to secure a swing of the prick-punch at a given time in the rotation of said wheel toward and against the side of the collet T, confined between the ends of the mandrels C² D², as has been described, and thus to mark the same for the after-reception of the drill, by the operation of which it is to be drilled, and after so marking the collet to allow the prick-punch to be swung back to its normal position under the reaction of the spring W², connected to its carrier, as has been described, it being of course understood that the prick-punch is located for such operations and purpose in proper relation to the collet to be marked by it, and otherwise, as will hereinafter appear.

The circular saw J² is vertical, and it is fastened to one end of a horizontal mandrel, Y², which turns in suitable horizontal bearings of parallel vertical arms Z² of a common horizontal sleeve, A³, having a screw-threaded bore, which receives a corresponding screw-threaded spindle, B³, that is made fast therein by turning up a thumb-screw, C³, of the sleeve A³, and at its ends D³, of conical shape, it is suspended in corresponding shaped bearings of supports E³, projecting from one side of the bed-plate. The axis of the circular saw and its mandrel is at right angles to the axis of the collet-centering mandrels C² D² and parallel with the axis of the drill S and its mandrel, and the saw in operative position upon the collet is across the edge thereof and in a vertical plane coincident with a radial line of the collet, Fig. 5.

F³ is a pulley on the saw-mandrel, through which, with a belt, (not shown,) to connect it with any suitable driving-shaft, (not shown,) and so as to continuously rotate the saw; and the throwing of the cuttings of the saw in operation is guarded against by a stationary bonnet (not shown) attached to one of the supports Z² for its mandrel.

The center spindle, B³, of the sleeve A³, and from which the saw-mandrel supports Z² project, is free to turn in, but by shoulders and nuts at its ends it is held against movement lengthwise through its bearings, first having loosened its confining thumb-screw C³, so as to secure by turning it a movement of the sleeve A³ along the length of said spindle in one or the other direction, according to the direction in which the spindle is turned, carrying the circular saw with it, and which thereby can be adjusted and set by turning up the said thumb-screw C³, as may be desired, in relation to the axis of the collet to be sawed by it, and all as will hereinafter fully appear.

H³ is an arm which is attached to or may be a part of the sleeve A³, before referred to, and which carries the circular saw, as has been described, and this arm projects downward therefrom and into position to rest at its lower end through a friction wheel or roller, J³, against the cam face and periphery K³ of a wheel, L³, attached to and continuously rotating with the horizontal shaft N, carrying the cam-wheels O P, all as before described. This cam-face K³ is shaped in one part, M³, to swing the circular saw into operating position upon the collet confined and centered between the centering-mandrels, and in another part, N³, in continuation of part M³, to gradually move the saw in and toward the axis of the collet sufficiently to have it cut completely through the thickness and for the whole width of the collet, and thus to split it, as desired, and in the remaining part, O³, after the saw has so completed the cut or split of the collet, to then withdraw the saw therefrom and return it to its normal position, and all during one rotation of the shaft N.

In a machine constructed and arranged in its several parts and otherwise organized as has been fully described, the prick-punch T², drill S, and circular saw J² are each and all moved toward and away from and put out of operation on the collet centered and held by and between the collet-centering mandrels C² D², and these movements of said parts (the actuating mechanism for and the operation thereof on each part having been heretofore particularly and separately described) all occur in and during one rotation of the shaft N, and each in relation to the others with a collet centered and secured, as described, and all the working parts in their normal positions, Figs. 1, 2, and 3, and the driving-pulley E, clutched with its shaft C, substantially as follows:

The prick-punch T² first moves forward to prick and mark the collet, and then having returned to its normal position it there remains until the drilling and splitting of the collet is completed, which go on simultaneously. The drill, under continuous rotation, is moved and gradually fed to and through the collet, from side to side thereof, and thus it drills a hole through the collet, Figs. 5, 6, and 7, beginning at the prick-mark previously made by the prick-punch, as before stated, and the circular saw, also under continuous rotation, is moved forward to and into contact with and fed gradually through the collet toward the center thereof, thus sawing and splitting the same radially. The drill, while boring the collet and under the gradual forward feed, as stated, and from time to time, owing to the depressions P³ in its operating-cam Q, is drawn backward sufficiently to thereby secure a clearing of the drill and of the bore in the collet made by it of the cuttings produced from the drill, the drill immediately returning to its position before it was drawn backward, and its forward feed again going on, as before, and so on, until the hole is finished, when the drill is returned to its normal position, as also the circular saw, which at or about that time has completed its work of splitting the collet, and having then disconnected the driving-pulley E, stopping the machine. The collet so drilled and split is removed and another inserted, and the machine again put in operation, and so on, as before.

In removing the collet, the mandrel C² is first loosened and then, as it is drawn back, the mandrel D² is pushed forward, pushing the collet out of the surrounding sleeve O² and holding it on the teat d of the mandrel C², to be by said mandrel removed as the same, first having loosened its thumb-screw M², as before stated, is drawn back.

The machine, in the construction and arrangement of its several parts and as has been herein fully described, obviously is capable of adjustment in any and all relations which can ever possibly be required in the practical operation and use of a machine for the purpose for which this machine is designed.

Having thus described my invention, I claim—

1. In combination, mechanism to hold and center a collet, a drill to drill the so held and centered collet at and across one side and in a direction intersecting a radial line thereof, and mechanism to rotate and mechanism to automatically feed said drill forward and to return it, substantially as described, for the purpose specified.

2. In combination, mechanism to hold and center a collet, a drill to drill the so held and centered collet at and across one side and in a direction intersecting a radial line thereof, and mechanism to rotate and mechanism to automatically feed said drill forward and to return it, and which is also arranged to act from time to time, and while the drill is drilling, to reciprocate the drill, substantially as described, for the purpose specified.

3. In combination, mechanism to hold and center a collet, a saw to split the so held and centered collet across and through its thickness at one side thereof, and mechanism to rotate and mechanism to automatically feed said saw forward to and through the thickness of the collet and to return it from out of said collet, substantially as described, for the purpose specified.

4. In combination, mechanism to hold and center a collet, a prick-punch to prick or mark the so held and centered collet preparatory to being drilled, mechanism to automatically reciprocate said prick-punch, a drill to drill the so held and centered and marked collet at and across one side and in a direction intersecting a radial line thereof, and mechanism to rotate and mechanism to automatically feed said drill forward and to return it, said prick-punch and said drill being arranged to operate, as described, in coincident planes relative to the axis of the collet, substantially as described, for the purpose specified.

5. In combination, mechanism to hold and center a collet, a drill to drill the so held and centered collet at and across one side and in a direction intersecting a radial line thereof, mechanism to rotate and mechanism to automatically feed said drill forward and to return it, a saw to split the so held and centered collet across and through its thickness at one side thereof, and mechanism to rotate and mechanism to automatically feed said saw forward to and through the thickness of the collet and to return it from out of said collet, substantially as described, for the purpose specified.

6. In a machine for drilling and splitting a collet, mandrels $C^2$ $D^2$ and supports $E^2$ $F^2$, respectively, therefor, said mandrels constructed and arranged to confine and center a collet between them and to be adjusted on their respective supports in relation to each other and the collet, substantially as described, for the purpose specified.

7. In combination, mechanism to hold and center a collet, a drill to drill the so held and centered collet at and across one side and in a direction intersecting a radial line thereof, and mechanisms to rotate and to automatically feed said drill forward and to return it, composed of a reciprocating carriage or slide, V, carrying the drill, a rotating cam, Q, arranged to bear against said carriage, and means to confine the carriage to said bearing, substantially as described, for the purpose specified.

8. In combination, mechanism to hold and center a collet, a saw to split the so held and centered collet across and through its thickness at one side thereof, mechanism to rotate and mechanism to automatically feed said saw forward to and through the thickness of the collet and to return it from out of said collet, said automatically saw-feeding and saw-reciprocating mechanism being composed of a swinging frame carrying the saw and having an arm, $H^3$, a rotating cam, $K^3$, arranged to bear against said arm $H^3$, and means to confine the arm to said bearing, substantially as described, for the purpose specified.

9. In combination, mechanism to hold and center a collet, a drill to drill the so held and centered collet at and across one side and in a direction intersecting a radial line thereof, mechanisms to rotate and to automatically feed said drill forward to and into the collet and to return it therefrom, said automatically drill-feeding and drill-returning mechanism being composed of a slide, V, which carries the drill and is made in parts $V^3$ $V^4$, arranged to be adjusted in relation to each other, a rotating cam, Q, arranged to bear on one part of said carriage, and means to confine said part of carriage to said bearing, substantially as described, for the purpose specified.

10. In combination, mechanism to hold and center a collet, a saw to split the so held and centered collet across and through its thickness at one side thereof, mechanism to rotate said saw and mechanism to automatically feed said saw forward to and through the thickness of the collet and to return it from out of said collet, said automatic saw-feeding and saw-returning mechanism being composed of a swinging frame carrying the saw and having an arm, $H^3$, a rotating cam, $K^3$, arranged to bear against said arm $H^3$, means to confine said arm to said bearing, a screw-threaded sleeve, $A^3$, carrying said swinging frame, and a screw-threaded axial spindle, $B^3$, entered into and through said sleeve $A^3$, and turning in and secured to fixed bearings $E^3$, all substantially as described, for the purpose specified.

11. Mechanism for holding and centering a collet, composed of mandrels $C^2$ $D^2$, adjustable in their supports $E^2$ $F^2$ in relation to each other and the collet, in combination with a shell, $O^2$, to surround said mandrels and collet, substantially as described, for the purpose specified.

In testimony whereof I have hereunto set my hand in the presence of two subscribing witnesses.

CHAS. V. WOERD.

Witnesses:
WM. S. BELLOWS,
ALBERT W. BROWN.